(12) United States Patent
Ross et al.

(10) Patent No.: US 8,151,178 B2
(45) Date of Patent: Apr. 3, 2012

(54) ASSOCIATIVE MEDIA ARCHITECTURE AND PLATFORM

(75) Inventors: Jennifer Ross, Boulder, CO (US); William Snyder, Lafayette, CO (US); Ned McClain, Boulder, CO (US); Trent R. Hein, Boulder, CO (US)

(73) Assignee: G. W. Hannaway & Associates, Boulder, CO (US)

( * ) Notice: Subject to any disclaimer, the term of this patent is extended or adjusted under 35 U.S.C. 154(b) by 1677 days.

(21) Appl. No.: 10/871,883

(22) Filed: Jun. 18, 2004

(65) Prior Publication Data

US 2005/0060640 A1 Mar. 17, 2005

Related U.S. Application Data

(60) Provisional application No. 60/479,401, filed on Jun. 18, 2003.

(51) Int. Cl.
*G06F 17/00* (2006.01)

(52) U.S. Cl. .................. 715/202; 715/810; 705/14.4

(58) Field of Classification Search .............. 715/500, 715/500.1, 201–204; 705/51–59; 709/232
See application file for complete search history.

(56) References Cited

U.S. PATENT DOCUMENTS

| | | | |
|---|---|---|---|
| 6,135,646 A * | 10/2000 | Kahn et al. ............ 709/217 |
| 2002/0120577 A1 | 8/2002 | Hans et al. |
| 2002/0174199 A1 | 11/2002 | Horvitz |
| 2003/0069964 A1 | 4/2003 | Shteyn et al. |
| 2003/0079015 A1 | 4/2003 | Fein et al. |
| 2003/0177237 A1 | 9/2003 | Stebbings |
| 2003/0200316 A1 | 10/2003 | Isozaki et al. |
| 2003/0204592 A1 | 10/2003 | Crouse-Kemp et al. |
| 2003/0236886 A1 | 12/2003 | Oren et al. |
| 2004/0024886 A1 | 2/2004 | Saxena |
| 2004/0117483 A1 | 6/2004 | Singer et al. |
| 2004/0117484 A1 | 6/2004 | Singer et al. |
| 2004/0117491 A1 | 6/2004 | Karaoguz et al. |
| 2004/0243708 A1 | 12/2004 | Stebbings |
| 2006/0053077 A1 * | 3/2006 | Mourad et al. .......... 705/51 |
| 2007/0005795 A1 * | 1/2007 | Gonzalez ............. 709/232 |
| 2007/0250195 A1 * | 10/2007 | Rhoads et al. .......... 700/94 |

* cited by examiner

*Primary Examiner* — Amelia Rutledge
*Assistant Examiner* — Quoc A Tran
(74) *Attorney, Agent, or Firm* — Marsh Fischmann & Breyfogle LLP; S. Langley; K. Lembke (57) ABSTRACT

An associative media architecture and platform that enables communication of media objects between participants using a variety of communication infrastructures and media presentation devices as determined by the users and owners of the media assets. Media assets formatted as media representations are associated with a globally unique identifier to form a media object. The media object can contain any media representation irrespective of format. The media object is an elemental entity having characteristics that are preferably retained throughout the life of the media object. The media object may be owned by one or more participants. The media object may be associated with owner preferences that can influence the context in which the media object is presented. The media object may exist in multiple storage locations, although each stored instance of the media object retains its unique identification and remains associated with the owner preferences.

14 Claims, 5 Drawing Sheets

ASSOCIATIVE MEDIA ARCHITECTURE AND PLATFORM

RELATED APPLICATIONS

The present invention claims benefit to U.S. Provisional Patent Application Ser. No. 60/479,401 filed on Jun. 18, 2003, the specification of which is incorporated herein in it entirety. This application is also related to U.S. patent application Ser. No. 10/092,709 entitled "SYSTEM FOR UNIQUELY IDENTIFYING ASSETS AND SUBSCRIBERS IN A MULTI-MEDIA COMMUNICATION NETWORK", published on Oct. 30, 2003 as U.S. Publication No. 20030204592, abandoned, which is incorporated herein by reference.

BACKGROUND OF THE INVENTION

1. Field of the Invention

The present invention relates, in general, to media distribution, and, more particularly, to software, systems and methods for distributing media from media producers to consumers in a manner that is consistent with relationships between producers and consumers.

2. Relevant Background.

Media is a blanket term referring to audio, video, images, and the like, that capture real or fictional events for distribution and presentation. Digital media refers to sound, pictures, text and video available in a digital format suitable for transfer across digital communication networks such as the Internet or other network. A media presentation comprises one or more media components (e.g., clips, images, tracks, files, scenes and the like) that are communicated to a presentation devices such as a computer, set top box (STB), television, radio, cellular phone or other device capable of "playing" the media components to a subscriber or consumer. In an important sense, a major goal of media production, distribution, and playback technology is to control the quality, timing and content of the presentation in a manner that communicates a desired message to the consumer.

Conventional media distribution is driven by existing infrastructure for transporting the media components from a producer to a consumer. Before the advent of communication technologies such as telephones and over-the-air broadcasting, communication was person-to-person. In other words, a story-teller (producer) was in direct contact with the audience (consumer) for a particular presentation. In this environment the producer could directly control the message that was conveyed and the consumer could directly control what messages he/she wished to perceive because the association between media producer and consumer was direct and unavoidable. Moreover, the lack of a communication infrastructure meant that there was no infrastructure that could interfere with or affect this association between the producer and consumer.

Once communication infrastructures separated producers and consumers, the ability to control the quality, timing and content of the presentation was necessarily affected. In conventional radio/television broadcast, for example, content is supplied on rigorously defined schedule. Producers must supply media to meet the schedule and consumers must retrieve and view presentations at scheduled times. Producers must select amongst the available distribution technologies such as radio, television and movies because it is difficult or impossible to target a presentation using all technologies. Likewise, consumers are restricted to playing the presentation on devices chosen by others. Moreover, producers are forced to produce media that is more often than not designed for mass appeal to justify the costs of the infrastructure. Similarly, consumers must compromise their desire to receive a particular message in favor of receiving a presentation designed for a general audience. As a result, media producers and consumers are becoming increasingly alienated from each other.

Communication infrastructures are implemented by communication "utilities" such as telephone companies, cable companies, satellite companies and the like. Each of these technologies has advantages and limitations with respect to the others, and each was developed to transport particular types of media. For example, television signals were allocated to particular portions of the radio frequency spectrum and required particular signal formats. In order to use television as a distribution channel, the media (as well as the producers and consumers) were dependent upon the infrastructure. Now, however, digital media can be transported across all of the various communication infrastructures.

Independently, there is an ongoing proliferation of consumer devices for playing digital media. These devices not only provide new, convenient modes of playing media, but are often able to couple to multiple communication infrastructures. For example, a relatively inexpensive home computer can connect to media sources directly, through local area networks, through the telephone, cable and wireless connections to the Internet, as well as receive conventional television, radio and cable broadcasts. Devices that were once special-purpose or task-specific devices are now able to be general-purpose media presentation devices. As a result, content and application owners are adopting media delivery solutions that decrease their reliance upon proprietary technologies and closed systems typical of the existing communications infrastructure.

However, in spite of the improving technologies for producing and displaying content, the infrastructure for delivering content continues to govern the producer-consumer relationship. Owners of the communication infrastructure compete with each other for customers, often by competing for exclusive rights to the content that is transported over their infrastructure. Also, communication utilities create complex billing and service bundling in an attempt to bind customers to particular delivery technologies. This has further alienated consumers and producers in that the infrastructure entities are actively seeking to limit the manner in which digital media is delivered even though the technology for distribution is no longer dependent on the infrastructure. Accordingly, a need exists for systems, methods and software that enable media distribution in a manner that re-establishes and/or preserves the essential association between producers and consumers of the media.

SUMMARY OF THE INVENTION

Briefly stated, the present invention involves an associative media architecture and platform that enables transfer of media objects between participants using a variety of communication infrastructures and media presentation devices as determined by the users and owners of the media assets. Media assets formatted as media representations (e.g., a file having a playable, printable, or presentable, projectable media format, a media stream, a disk, wire, or carrier wave having analog and/or digital data encoded thereon, and the like) are associated with a globally unique identifier to form a media object. In one embodiment, the media representation may include a variety of tangible products such as physical props, sets, and the like that might be transported to a presentation location and contribute to a media event. The media object can be represented in any valid format. The media object is an elemental entity having characteristics that are preferably retained throughout the life of the media object. The media object is typically owned by one or more participants. The media object may be associated with owner preferences that can influence the context in which the media object is presented. The media object may exist in multiple storage locations, although each stored instance of the media object retains its unique identification and remains associated with the owner preferences.

During the life of the media object, it may be used repeatedly by other participants, also referred to as users and subscribers. Using a media object includes playing and presenting the media object, authoring new media assets (i.e., "derivatives") that contain all, part or substitute a media object, storing the media object or derivatives, distributing the media object or derivatives, and the like.

Participants including owners, users, subscribers, and others, are associated with a globally unique user ID. Participants are also associated with preferences that can influence the context in which a media object is presented. These preferences include a specification of the type of device used for displaying/playing the media assets, rating requirements, level of service, physical address, user names, billing preferences, intended purpose, and the like.

The system of the present invention implements a communication of a media object by receiving a request from a known subscriber for one or more registered media objects. The system uses the requesting participant's unique ID to access the preferences associated with the requesting participant. The system uses the requested media object's unique ID to access the preferences associated with the requested media object. The system implements a negotiation using the preferences to determine whether a license for the requested media asset is permitted. When a license is permitted, the system may use the preferences to implement a financial transaction between the requesting and owning participants. When a license is permitted, the requesting participant is provided sufficient information to access the requested media object.

In this manner, the system of the present invention enables a transaction between a media asset owner and a participant that desires to use the media asset in a manner that is independent of the communication infrastructure used by either participant. More specifically, the media asset owner can license various users and uses through a mechanism independent of the communication infrastructure used to deliver the media asset.

Each time a media object is successfully delivered, a specific and unique instance of that object is created. The specific instance is contained within a "product" which is the product of a media object request. The product may contain a single media object or multiple media objects that are combined (e.g., sequenced, overlaid, tiled, subtracted, and the like). The product is defined by a set of media object references and metadata specifying how the media objects will be combined when played. Because of the influence of the requesting participant's and the owner's preferences, the product is contextually relevant. In other words, although the media object in its elemental state is not specified for a particular communication infrastructure or player device, the product containing the delivered instance is specified for these variables that affect the context in which the object is presented.

In a specific implementation the present invention involves a method for delivering a media product. A plurality of media objects are identified, where the identified plurality together form the media product. The media product may be designed to combine the identified media objects sequentially, for example, such that the beginning of one object is spliced to the end of another media object. Alternatively, media products may combine the media objects in parallel such that more than one media object is presented at a single time (e.g., a video object and a sound object playing at the same time, picture-in-picture, or a composite of multiple independent media elements). For each identified media object, at least one source location from which the identified media object can be obtained is determined. Media objects may be sourced from a variety of locations, some of which will be storage or cache locations. Alternatively, these locations may be the source of a media stream which will be available at playback time. Each of the identified media objects is delivered from its source location to a media player at a playback location in time for playback. A transaction may be generated for each delivered media object between an owner of the media object and an operator of the media player. In this manner, a given media product may involve multiple transactions between various media object owners, each of which are individually compensated for use of their media in the media product (e.g., a soundtrack owner is compensated separately from an owner of a movie, or owners of individual scenes or parts of a documentary are individually compensated).

DETAILED DESCRIPTION OF THE PREFERRED EMBODIMENTS

The present invention involves an associative media architecture and platform that enables communication of media objects between participants using a variety of communication infrastructures and media presentation devices as determined by the users and owners of the media assets. Media assets formatted as media representations (e.g., a file having a playable media format, a media stream, a disk, tape, wire, or carrier wave having analog and/or digital data encoded thereon, and the like) are associated with a globally unique identifier to form a media object. The media object can contain any media representation irrespective of format. The media object is an elemental entity having characteristics that are preferably retained throughout the life of the media object. The media object may be owned by one or more participants. The media object may be associated with owner preferences that can influence the context in which the media object is presented. The media object may exist in multiple storage locations, although each stored instance of the media object retains its unique identification and remains associated with the owner preferences.

The present invention is described in terms of several specific examples and implementation, however, unless specified to the contrary these examples are not a limitation to the possible implementation of the present invention as set out in the appended claims.

U.S. patent application Ser. No. 10/092,709 entitled "SYSTEM FOR UNIQUELY IDENTIFYING ASSETS AND SUBSCRIBERS IN A MULTI-MEDIA COMMUNICATION NETWORK", published on Oct. 30, 2003 as U.S. Publication No. 20030204592 discloses a particular implementation of a system for registering media objects that may be used in implementations of the present invention, however, is not required for implementation of the present invention. Accordingly, it is specifically intended that the claims presented herein exclude from their scope subject matter related to the specific media object registration system and method set out in the claims of U.S. Publication No. 20030204592.

Current electronic media distribution methodologies are limited by the fixed relationship currently enforced between subscribers, devices and media formats by access infrastructure operators. Conventionally, every primary communications network (e.g., telco, multi-service operator (MS), cable company, satellite broadcast company, and the like) is an island where a subscriber is assigned a specified device upon an isolated infrastructure, and the device-infrastructure relationship defines the relationship between the subscriber and media. The present invention recognizes that the relationship between a subscriber and media/application desirably escape the constraints placed upon it by both the device and the infrastructure, to push contextual constraints to the post-relationship level, rather than have the constraints define the subscriber-media/application relationship.

Figure 1:
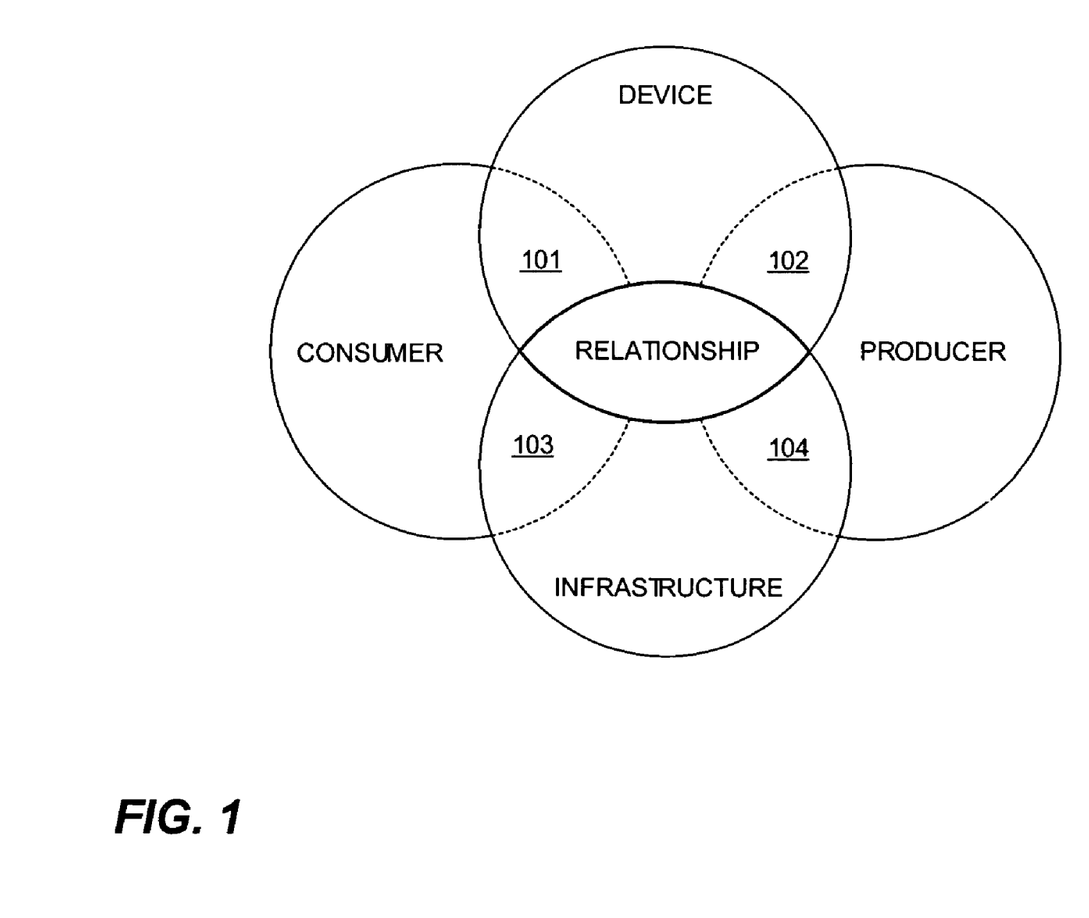
FIG. 1 conceptually illustrates a consumer-producer relationship enabled by the present invention.

FIG. 1 conceptually illustrates a consumer-producer relationship enabled by the present invention. FIG. 1 illustrates where constraints, limiting the scope of current subscriber-media/application relationships, are created by the device-infrastructure relationship. In FIG. 1, each of the interacting entities in a media relationship are represented by circles. Consumers represent the end-users, subscribers, viewers and the like that experience the content and/or use and/or modify the content to create new content. Producers represent the wide array of individuals and organizations that create, produce, and/or own content such as movies, pictures, sound streams, multimedia presentations, and the like. Producers include artists, actors, movie producers, movie production companies, photographers, graphic artists, copyrighters, screen writers and the like. The device entity represents manufactures of devices used to present content and/or record and store content. Devices include televisions, computers, digital projectors, radios, cellular telephones, and the like that can receive media data and present the content encoded in that data to a consumer. The infrastructure entity represents telephone companies, cable companies, MSOs, wireless infrastructure companies and the like that own and/or operate infrastructure to deliver content from a producer to a consumer. It should be understood that any particular individual or organization may be in several of the roles represented in FIG. 1 at various times, even with respect to a single item of content.

The central point of intersection labeled "relationship" in FIG. 1 represents an ideal relationship that satisfies producer needs and consumer needs. The various interactions between the entities shown in FIG. 1 represent constraints that limit the scope of current subscriber-media/application relationships. For example, interaction 101 represents the constraints created when content is available on specific devices that are either not available or otherwise undesirable to the consumer. As a specific example, consider a consumer that wishes to view a movie on their home television, but that movie is available on portable media such as a video tape or DVD player. Similarly, the content may be available in standard definition, but the consumer desires to watch the content in high definition. In each case the consumer must compromise their desires and/or purchase other devices to obtain their desired end result. Similarly, interaction 102 represents the conflict that results when a producer has made a content item available in a format that is inconsistent with a particular device type. A specific example might be a music video that the producer wishes to distribute with high fidelity 5-channel or 6-channel sound. However, television manufacturers or set top box (STB) manufacturers may not make high fidelity sound systems with the equipment, forcing the producer to compromise their desired goals and/or limit distribution of their content.

Interaction 103 represents a constraint frequently imposed because consumers are not usually able to subscribe to all possible content delivery infrastructures, and so must select a particular cable operator and/or a particular internet service provider, and therefore accept the content made available over that infrastructure. Conversely, producers are forced to pick and choose amongst infrastructure providers ranging from recording/CD/DVD distributors to cable providers and the like, many of which insist on various types of exclusivity. As a result of these interactions, device entities and infrastructure entities effectively inhibit the ideal relationship between the producer and consumer.

The optimal relationship in media communications is one formed between a subscriber and media, irrespective of the device and access infrastructure. However, for the duration of modern history, incumbent (monopoly) communications companies have tied media communications products such as telephony and television to specific, single purpose devices and an infrastructure reducing scope to highly restrictive "walled gardens" and service packages where a la carte requests are rare and/or expensive.

Wired Networks

Both telephony and cable television carriers have been chasing lucrative "Broadband" business cases for the adaptation of pre-existing communications infrastructure with segments of Internet Protocol for the purpose of providing high speed Internet service. Weighing heavily in favor of these cases are the extensive availability of "free" (from the perspective of a carrier) media/application content.

Internet Protocol facilitates the bi-directional distribution of packet-based data between clients (receivers) and servers (transmitters) and amongst peers (transceivers). Packet-based transport can accommodate the distribution of any media object type from text to high definition video.

The invention of Internet Protocol (IP) based audiovisual media solutions began during the initial days of the cultural popularity of the Internet and were focused upon delivering "free" content to home computers (i.e., content that does not bear an incremental charge upon delivery). As tools and solutions matured, adaptations were made to existing devices such as set top boxes to direct IP-delivered media to television sets. Eventually, the tools and solutions will evolve beyond the network operator's ability to segment traffic away from the walled garden protecting the primary (legacy) "single-purpose" businesses and the Internet Protocol delivered audiovisual solutions will be more attractive and efficient than RF-based delivery of media.

Curiously, cable systems currently attempt to "add value" through limiting access to content and application packages. For example, a cable system will offer several packages where the most restrictive package, having the least number of channels available is the least expensive, and the subscriber can pay higher prices to remove restrictions on channels and services. In several cases, content owners (television stations and cable channels) have been in carriage disputes with cable operators and subscribers face having their access to content restricted without even a consultation. Typically, there is no alternate method available to subscribers that would enable them to subscribe directly to media/applications if the cable system is not involved at some level. Additionally, the average MSO is unable to envision a world where the entire RF spectrum available within the fiber-coaxial infrastructure is dedicated to connectionless IP-based traffic. The eventual fate for the MSO infrastructure appears to be as a commodity-driven conduit for generic IP-based traffic.

The average telephone company continues to rely upon a model of circuit-switched networking which electronically replicates the era of the switchboard, where human operators manually changed the path of wires to complete voice calls. The majority of telephone companies adopted asynchronous digital subscriber line (ADSL) as a way of extending the monetization of their infrastructures, attaining additional IP networking income in competition with the MSO's cable modem-based IP solution and the plain old telephone service (POTS)-based online service providers such as America Online (AOL). Beyond the RF-based segmentation of IP traffic upon their infrastructure, the telephone company's major business is extracting connection-based fees for local and long-distance voice traffic. It has been clearly demonstrated that there is an inability to adapt to connectionless, IP-based technologies through the application of tariffs (and request of other governmentally enforced restrictions) upon IP-based voice products. Some speculate that telephone carriers will not survive a connectionless, IP-based future where anyone with a PDA and a media/application client may mutually form a voice or video "call" with a peer upon any IP network—their networks however will survive as commodity-based IP conduit.

Conventional telephony and cable television infrastructures will be conformed to a single IP-based bandwidth commodity in a matter of years, however the majority of carriers maintain tunnel vision where their primary "utility" service is concerned. Carriers seem unable to recognize the separation of content and infrastructure has already begun, creating the movement towards commodity status.

Wireless Networks

The rapid proliferation of wireless IP carriers around the world is signifying the start of an always-connected future. "Third Generation" services are generally tied to phone devices, however network operators are also releasing PCM-CIA cards enabling laptop computers and PDAs with 3G-powered communication capabilities. Leading "3G" in both speed and hype is the growing abundance of "IEEE 802.11b" WiFi hotspots. Named for the limited area of service maintained by a single node (commonly a 200' perimeter found around coffee shops and locations where business persons are found), WiFi hotspots have escaped its corporate roots and is vying for mobile supremacy but are suffering from a lack of subscriber management and billing (OSS, etc.) standards.

With all the growth in wireless networking, there are speed bumps preventing the access method from reaching its full potential at this time: the disparity between North America's spectrum standard versus worldwide spectrum standards, the lack of reciprocal roam billing solutions, the lack of extensible "next generation" wireless business operations tools, the price of handsets in certain markets, the lack of applications that should drive consumer and business demand of high speed mobile solutions.

A more optimal communications solution contemplated by the present invention provides subscribers with a transparent roaming experience upon native wireless environments, third-party wireless environments and wired environments if required. Consequently, media/application owners would be able to facilitate the continuation of their relationships with roaming subscribers across all possible access methods.

Producers: Media/Application Owners

The typical content production timeline has most media corporations developing one-off presentations for specific delivery methodologies. Traditionally, additional media may be attributed to the original work as derivative or alternate production designed to augment a purchaser/subscriber's relationship to the primary work.

Within the MSO/cable system, a film product owner can-be requested to supply licenses addressing many different end-delivery scenarios: regional delivery by a local independent or affiliate television station, national broadcast by a network, cable distribution rights, pay per view, video on demand (VOD), near video on demand (NVOD) and subscription video on demand (SVOD). A televised film product can also expect to be exported and distributed to consumers in combination with adjunct media such as a foreign language voiceover track often produced and owned by a third party.

In addition to adjunct media explained above, a film's production company could also have associative media derived from the primary asset such as web sites, interactive information, entertainment or education product via ITV or CDROM/DVD and an audio soundtrack available for sale. Often this associative media is created and maintained by creative teams that have had no involvement with the creation of the original product.

Within most networked environments, media/application owners are restricted from establishing a direct relationship with the subscriber; the content is merely packaged with other media product, rebranded and delivered en masse to the maximum amount of persons within reach of the infrastructure.

The Internet is a wonderful tool for open exchange of information and the first environment that offered the promise of a direct relationship between Media/Application owners and subscribers. It is also the first example of an open standards-based infrastructure for the communication of educative, entertaining and informative media/applications. However, the vast majority of media/application owners desire a platform where they can monetize and maintain the value of their media assets.

There are few opportunities to present specific branding messages when the content is treated as a commodity as is the case where network operators and portals treat media/applications as a commodity. The MSOs and PPV operators charge the subscriber for a license to view the content, while they also present the content owner with very little flexibility in how their media is delivered.

Associative media, assembled from a precise mixture of owner-directed and produced authoring and contextually-derived, environmentally-aware influences allow subscribers and media/application owners to form and maintain relationships anywhere, anytime.

Continuity of service is becoming increasingly rare as digital media access (over "the Internet") is consolidated amongst incumbent communications access providers. Joining this act are the few Internet media mega-portal brands such as Yahoo!®, Real Networks® and Microsoft's MSN® who are sticking to portal-building through bundling media content.

AOL® is currently being out-AOLed by cable companies that lock customers in to "high speed" cable modem-delivered access contracts, converting dial-up users into broadband users.

The present invention reduces barriers and enables media owners to request open access agreements within a larger development of brand-free, subscriber-initiated relationships. The walled garden barriers must come down and carriers must allow la carte selections to become available.

Device Manufacturers

The future of optimized communication between media and applications and subscribers is really destined to be defined by the myriad of devices that will be network aware. A major potential limiting factor affecting device manufactures is whether they can eventually break away from being infrastructure and operator-defined. Many devices such as cell phones and PDAs have already started to evolve away from the single-function, utility directed use. Personal computers, by design, are the most extensible device attachable to a network and most network-attached devices are currently derived from PC architectures.

Current communications architectures enable operators to identify, track and bill for subscriber usage originating from a single pre-identified device (based on hardware-specific IDs such as MAC addresses and ESNs) across various "known" networks. This model does not scale to a reality where subscriber access occurs from n-multiple devices across "known" and "unknown" network infrastructures.

Wireless Devices

The cell phone, PDA and laptop computer are the current devices found within wireless networks. The introduction and proliferation of "smart" devices connected to network infrastructure by ways of Bluetooth (to other devices) or directly via 3G/WiFi chipsets enabling communication with other devices, servers or subscribers will become a reality. Other subscriber-owned network-attached devices such as shared media storage and home/service-based servers will likely follow.

Dozens of portable devices (and network-based services storage/transport/management/delivery) require the creation of a myriad of identification rule sets and administrative decisions. An example of this type of device is the WiFi-enabled camera available in consumer and professional models, allowing the photographer to ingest media from anywhere to their employer or their home in real time.

Home and Enterprise

Large, wire-connected entertainment devices are typically found in the home. Televisions and stereos are all being adapted for the reception of digital media content. Computers, already ubiquitous within the enterprise, have native network connectivity and many applications enabling video and voice communication, video broadcast reception, audio recording and playback and web browsing. Televisions are also taking a useful place amongst computers in many industries.

Recently, a leader in new product innovation has announced IP-connected televisions and recording devices to be marketed towards consumers in the near future. Cisco, a leader in network product innovation has announced Wireless IP-connected telephone devices to be marketed to enterprise managers. It is only a matter of time before the division between home and enterprise "function" is blurred for networked products in general.

Network-attached Media Storage

The TiVo® personal video recorder is the most commonly thought of residential digital media storage solution in use today. It is currently restricted to the storage of video content received over RF networks.

Digital media storage options in the future will be considerable more flexible, from TiVo-like residential media repositories to remote, regional media storage solutions storing all types of digital media within a virtual file system utilized by multiple devices, wired and/or wireless.

Optimal Media Relationship

An optimal media relationship is any continuous media-based relationship that allows subscribers and media/application owners (and their products) to transcend devices and infrastructure. A more optimal media relationship is enabled between a subscriber and media/application when communication is contextually maintained irrespective of the device and infrastructure utilized. This relationship is also sensitive to the dynamic influence of a subscriber's preferential settings and location, associated context, licensing for use and/or storage, and the expected and potential use of media object types within the Associative Media Platform (AMP)

The essential subscriber experience is equally influenced by the media/application owner and the subscriber. Both apply and dynamically affect rules within the media/application relationship as the communications product is used. Typically this is initially based upon media-device preferences maintained by the subscriber.

The restriction of media delivery through specific devices and infrastructures (Service Optimization) has also prevented the possibility of reciprocal subscriber interaction with media/application product. In addition, this device-infrastructure address limitation has prevented the formation of contextual relationships between media/application and subscribers over multiple devices and network architectures.

A contextual relationship can be as global as the familiarity of a brand experienced across media types, language, devices and network environments or as intimate as a subscriber's media and communications relationship preferences and media/application subscriptions following them from home to work and on vacation.

The Associative Media Platform in accordance with the present invention abstracts the infrastructure to a commodity, enables a media/application producer and owner to deliver their products to subscribers on n-devices designed to utilize media/application products whether they are graphical, animation, video, audio or text in any combination through a common media association and authoring solution.

Once access method has been commoditized, the ownership of subscribers is also abstracted from the network and any restrictions a network operator may place upon media requests. Because the identity of subscribers is no longer tied to the network or device, a new identification structure is introduced that enables both networks and media/application owners to conduct transactions with subscribers. In addition to the identification of subscribers anywhere in an AMP architecture, media assets and objects are also now identifiable anywhere in the AMP environment. Now that subscribers and media assets are identifiable anywhere in the AMP architecture, media/applications can now be created through the association of media assets, environment, context and the adaptability based upon the influence of subscriber-defined preferences.

Figure 2:
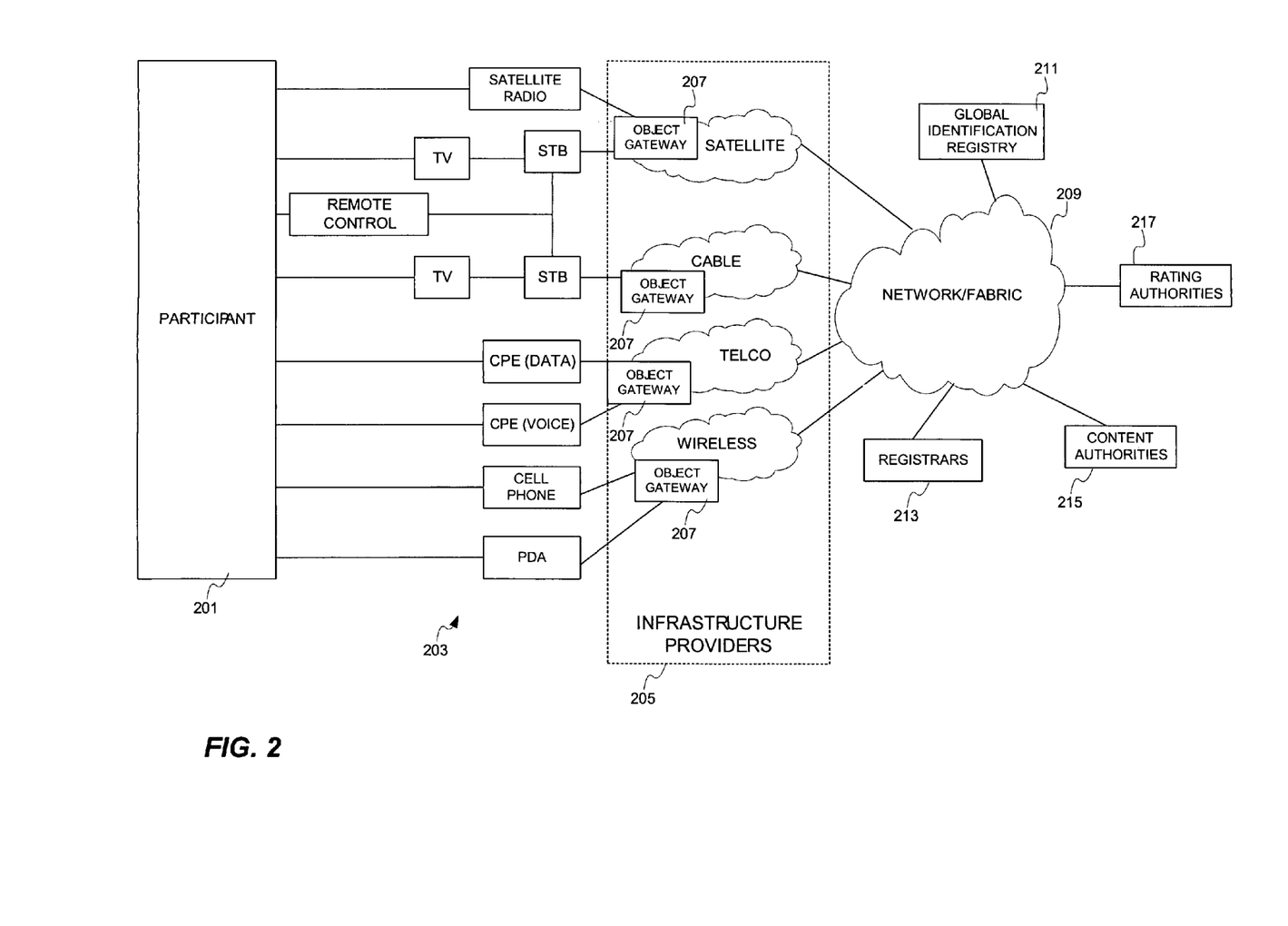
FIG. 2 shows a network environment in which the present invention is implemented.

FIG. 2 shows a network environment in which the present invention is implemented. Participant 201 is generally in the role of a consumer and/or producer of content as described in reference to FIG. 1. Participant 201 is able to interact with one or preferably more than one interface options 203 to make media item requests and receive delivery of media items for presentation. FIG. 2 shows exemplary user interface devices including satellite radio, television, set top boxes, customer provide equipment (CPE) from a telco (e.g., a telephone, switch, and the like), cellular phones and computer devices such as a personal digital assistant (PDA). Any or all of these devices may provides a direct user interface or support an indirect user interface through a remote control. Media requests may be made through the same device 203 used to present the content items, or made through independent media devices. The set of devices shown in FIG. 2 is for example, and in practice the present invention is readily adapted to support almost any type of device that can communicate with a data network using available data communication protocols.

Interface devices 203 communicate with various infrastructure providers which may have a pre-existing relationship with the participant 201, or may establish ad-hoc relationships as needed to service a particular media item request and/or delivery. Exemplary infrastructure providers include satellite providers, cable companies, telephone companies, wireless infrastructure companies and the like. In accordance with the present invention, the various infrastructure providers 205 provide object gateways 207 that support request/response traffic with particular user interface devices 203. An object gateway 207 is an entity that own and/or manages/operates the infrastructure that provides bandwidth (network access, cable access, data access, etc.) to a subscriber or media asset.

However, the present invention contemplates that infrastructure providers 205 are essentially commodity providers and that participant 201 is largely or completely unaware of which infrastructure provider is handling a particular media object transaction. In essence, participant 101 makes a media request by specifying particulars such as the name/identity of the desired media, device upon which the media will be presented, time that the media will be presented, and/or other characteristics that describe participant desires. Infrastructure providers receive these requests through object gateways 207 and communicate them to the AMP system via a communication network or fabric 209.

The entity roles have been specified by a team of "interested parties" working under the auspices of an authority called the "Global Identification Registry" (GIR) 211. The GIR 211 holds the responsibility for specifying communications and business relationship protocols within the AMP architecture. The GIR 211 also fulfills an administrative role recommending best practices through the issuance of documentation and maintenance of a (distributed) server network that provides authoritative XML schema and DTD standards data to AMP Servers worldwide on an "on-demand" basis. An exemplary server network is implemented as the Global Identification Registry LLC, a non-profit organization associated with the network domain gidr.org.

The Registrar 213 performs administrative and system level duties within the AMP architecture. Registrar field assignments, specifically those that fulfill identification (the Registrar is the keeper of the primary [unique] identifying component of an AMP ID), are influenced by guidelines specified by the GIR as operation and/or integration suggestions. Most Registrar field assignments affect the qualification and identification of system-level properties and are locally relevant categorical properties encoded within AMP ID fields or references to data resident within Registrar-managed databases. Some field assignments, such as Unique ID, may have global significance (between two unrelated AMP-enabled systems).

While a Registrar 213 manages physical access/transport/preference related system level duties within the AMP system architecture on behalf of a subscriber or media asset owner or licensor, content authorities 215 negotiate/provide all media-related products and/or services to a subscriber or media asset owner (or licensor). The content authority 215 provides a "system/service for subscribers and content owners to purchase and/or package services (like a long-distance phone service company or cable company) and/or settle payments for third party products, separate/external from the object gateway.

The Ratings Authority 217 is an entity that promotes a standardized method for rating content and its appropriateness for particular classes of subscribers. A Ratings Authority 217 may also maintain exchange and confirm ratings data recorded for media assets. A Ratings Authority 217 may be an independent entity that serves one or more Content Authorities 215/Object Gateways 207, or it may be a function (service) of a Content Authority 215 or a Service Provider 205. Ratings Authorities 217 provides a mechanism for determining the relationship of its ratings methodology with the methodologies/ratings systems of other Ratings Authorities 217. Some Ratings Authorities 217 may be specialized in nature, such as a Ratings Authority 217 that develops its ratings system in line with the expectations of a particular country, religion or interest group.

Each of the above entities exists within the AMP as an autonomous, yet interconnected system, with its own intra-entity communication protocols and well-documented inter-entity protocols enabling locally and globally relevant communication amongst entities on an as-required basis. This communication facilitates the integration, management, negotiation, transport and settlement of media across the AMP based on abstract identifiers.

Philosophically, the AMP entities are initially provided to adopters in a "Reference Implementation" format, delivering exemplary use of the entity APIs, Protocols, Specifications and Best Practices designed by the GIR 211 and developed towards a deployable state. The desired goal for the evolution of the AMP entities however, is to invite developers and those parties whom integrate/overlay the AMP technologies within/upon their systems to further develop entity systems based upon the eventually-open standards ratified and maintained by consensus of the GIR 211.

Figure 3:
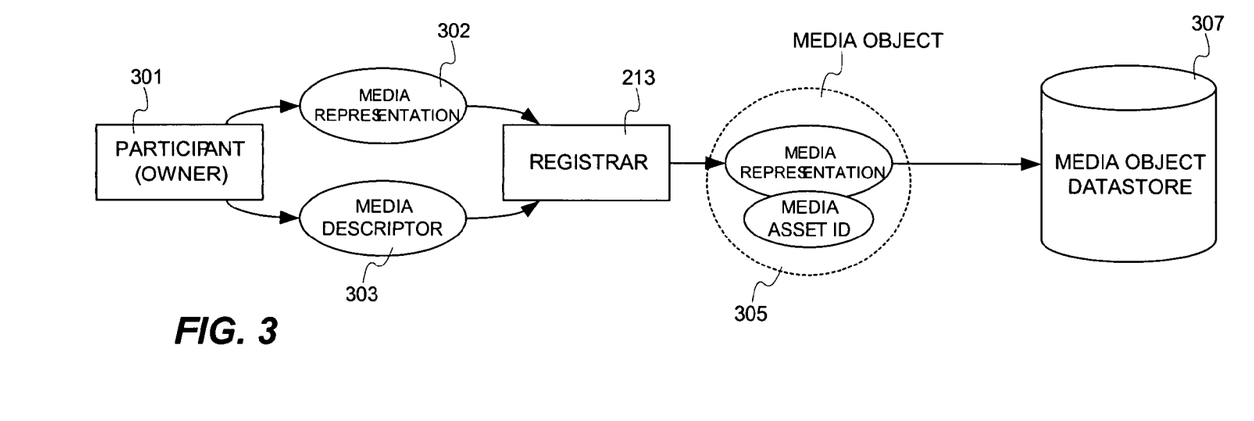
FIG. 3 illustrates entities and relationships involved in creating media objects in accordance with an embodiment of present invention.

FIG. 3 illustrates entities and relationships involved in creating media objects in accordance with an embodiment of present invention. Owner 301 (who is also a participant 201) is the owner of one or more media representations 302 by virtue of creating the media representation 302, purchasing or licensing the media representation 302, or other means of acquiring a media representation 302. Media representation 302 is an instance of a content item (e.g., a picture, movie, sound track, album, and the like). Media representation 302 may be physical representation (e.g., a film, CD, tape, DVD, etc.), or may be an electronic representation such as a digital file. A media representation 302 may comprise a collection of other media representations such as would be the case for a television show made up of segments of the show itself with interspersed commercial items, or a movie that has various formats, subtitles, audio tracks, and the like that together make up a unified content item from the perspective of the owner 301. Owner 301 also generates a media descriptor 303 that contains various information about the media representation such as an identification (e.g., an ID number, title, etc.), media type (motion picture, graphic, video, sound, etc.), file type (e.g., mpeg, jpg, mp3, etc.), usage restrictions (if any) and other information that the owner 301 desires to associate with the media representation 302. Owner 301 conveys both media representation 302 and descriptor 303 to registrar 213, which handles incorporation of a media object 305 into a media object datastore 307. The process of incorporation causes the media object 305 to be indexed and stored in a manner that enables it to be retrieved in response to participant requests. Physically and logically, the media object store 307 may be implemented as a single database or as a distributed database, and a media object 305 may exist in a single physical/logical location or distributed across multiple physical/logical locations.

Figure 4:
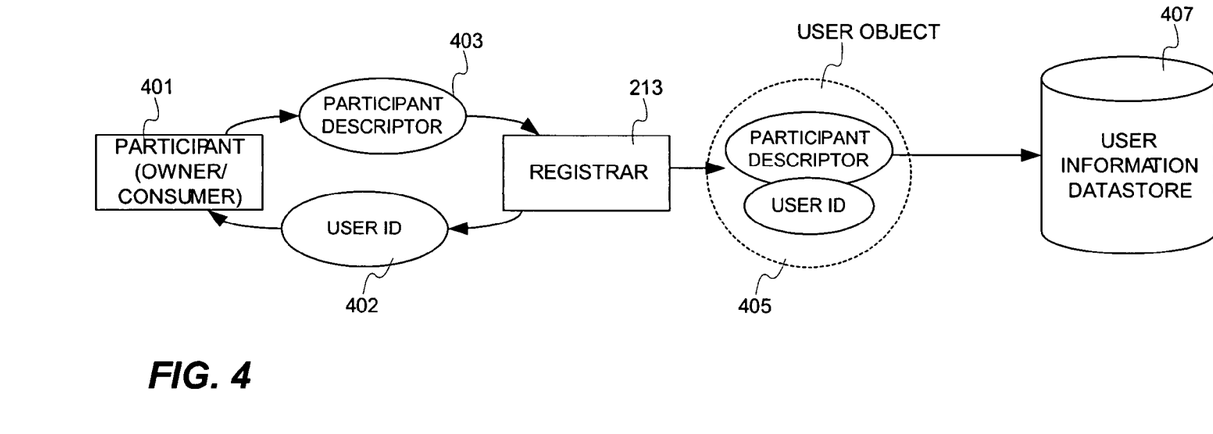
FIG. 4 illustrates entities and relationships involved in registering participants in accordance with an embodiment of present invention.

FIG. 4 illustrates entities and relationships involved in registering participants in accordance with an embodiment of present invention. FIG. 4 illustrates entities and relationships involved in registering a participant (e.g., an owner or consumer) in accordance with an embodiment of present invention. Participant 401 generates a descriptor 403 that includes information such as name, contact information, billing information, devices that are preferred by a particular consumer and the like. Participant descriptor 403 represents an instance of particular participant within the AMP system and allows the system to implement media object request for that participant. Participant 401 conveys the descriptor 403 to registrar 213, which handles incorporation of a user object 405 into a user object datastore 407. The process of incorporation causes the user object 405 to be indexed and stored in a manner that enables it to be retrieved in response to participant requests. Participant 401 is given a user ID that is persistently associated with the participant descriptor 403 by the registrar 213 for use in future transactions. Physically and logically, the user object store 407 may be implemented as a single database or as a distributed database, and a media object 405 may exist in a single physical/logical location or distributed across multiple physical/logical locations.

Figure 5:
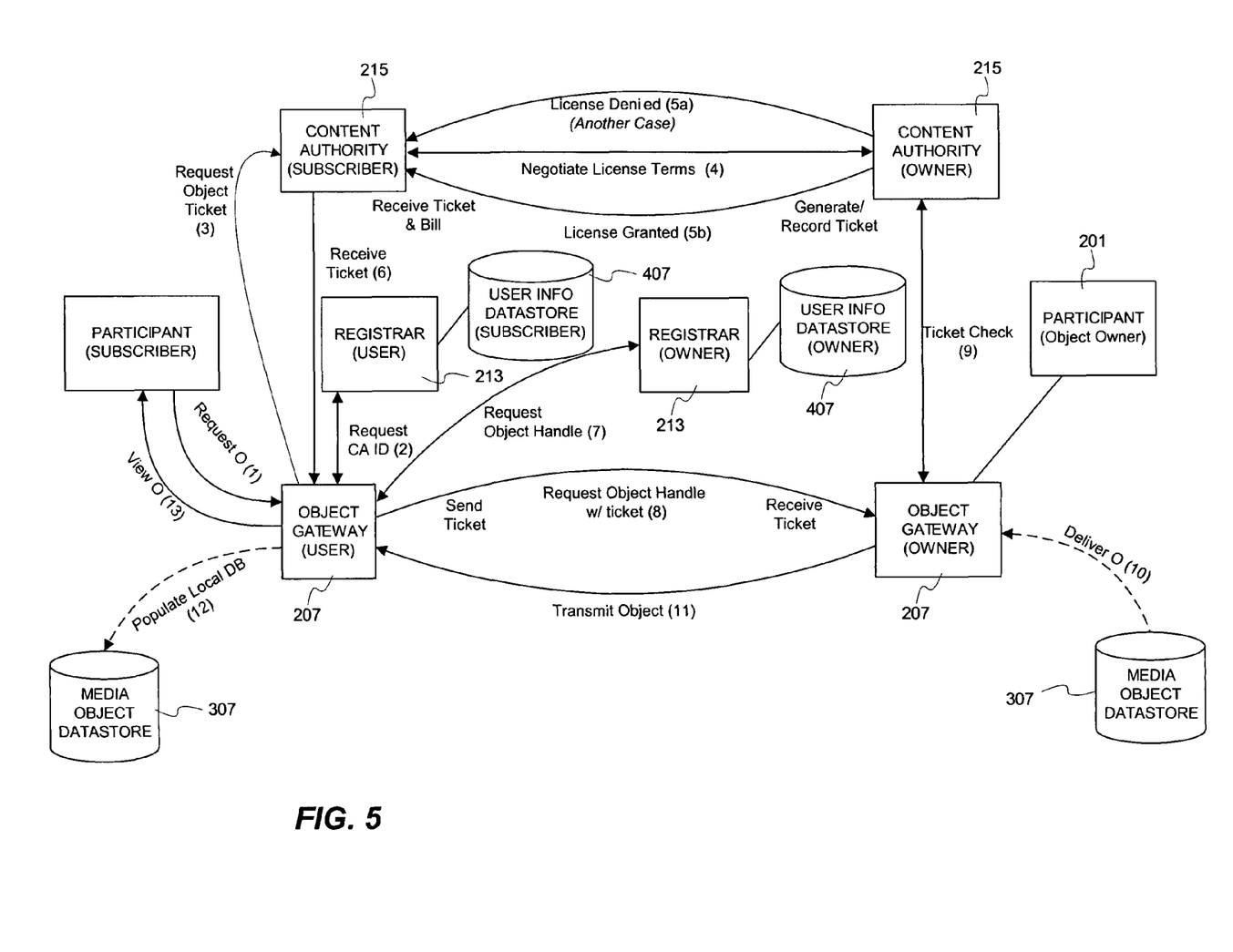
FIG. 5 illustrates entities and relationships involved a media transaction in accordance with an embodiment of present invention.

FIG. 5 illustrates entities and relationships involved in a media transaction in accordance with an embodiment of present invention. In operation, one or more media object stores 307 are populated with media objects 305, and multiple participants 201 are registered with the system by having user information stored in data stores 407. A consuming participant 201 makes a request that specifies, among other information, the participant ID together with information that sets out specifics of what media objects are desired, when they are desired, and any other user preferences that are appropriate such as the device upon which the media object is to be presented and the like. The request is conveyed to an object gateway 207 that knows the participant, and so can recognize the participant ID, contact the participant's registrar 213 and access the participant's user object 405 from the appropriate user datastore 407. The object gateway also refers to the consuming participants registrar 213 to identify any content authority 215 associated with that subscriber. The subscriber's object gateway 207 then contacts the subscriber's content authority 215 with information about the requested content item, and information about the consumer that is relevant to obtaining a license to that content item (e.g., user's age, payment restrictions, quality demands, and the like).

The subscriber's content authority 215 is able to identify a media object that satisfies the desired content item and identify the owner of that media object. In a particular implementation each media object is registered with a unique ID that includes a field that identifies the particular owner. In this manner, the media object ID will itself identify the owner and enable the consumer content authority 215 to contact the owner content authority 215. In a particular implementation the content authorities 215 negotiate to determine license terms. This negotiation essentially determines whether any restrictions associated with the media representation (e.g., price, availability times, usage restrictions and the like) conflict with consumer-specified requirements (e.g., price limitations, payment type, desired presentation time and the like). In the event no conflict exits, a license is granted and the consumer's content authority 215 communicates the license terms via a message referred to as a "ticket" with their participant's object gateway 207.

Figure 6:
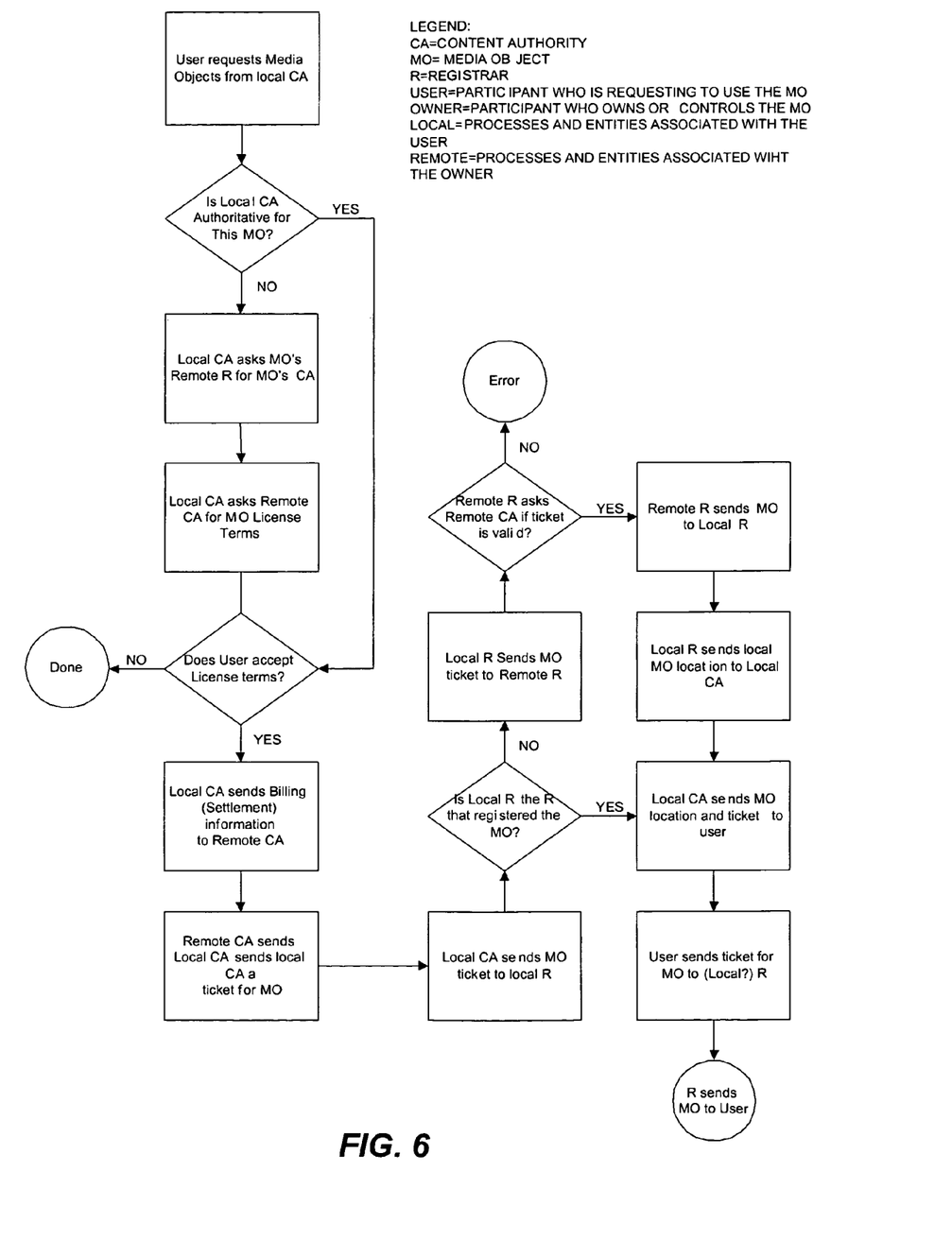
FIG. 6 illustrates in flow diagram form activities involved in a media transaction such as shown in FIG. 5.

The consumer's object gateway 207 uses the ticket to access the media object via the owner's object gateway 207. The owner's object gateway may communicate with the content authority 215 to verify the ticket information, and obtains the media object from the owners media object datastore 307. The media object is transmitted to the consumer's object gateway 207 where it is either delivered to the consumer participant 201, or stored for future presentation in a media object datastore 307. The consuming participant 201 can subsequently access the stored media object via its own object gateway 207 without further negotiation with the media object owner. For this reason, when a new media object request is received by a gateway 207 it will first check to see if that media object already exists in the media object datastore 307 associated with that consumer participant 201. FIG. 6 illustrates in flow diagram form activities involved in a media transaction such as shown and described in reference to FIG. 5.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A computer-based method for managing transfer of media assets formatted as media representations over digital communications networks to users, comprising:

storing a plurality of media objects in a datastore accessible via a communications network, wherein each of the media objects comprises a media representation, a unique identifier, and a media descriptor defining preferences of an owner of the media representation for use of the media representation;

storing a plurality of user objects in a datastore accessible via the communications network, wherein each of the user objects comprises a unique identifier for a user of media representations and a participant descriptor defining preferences of the user for using media representations;

receiving a request for one of the media objects from a network device operated by one of the users;

with a server, processing the request to identify a matching one of the user objects linked to the requesting one of the users and to identify a matching one of the media objects in the datastore;

operating the server to determine whether to fulfill the request by comparing the owner preferences for the media representation of the matching one of the media objects with the user preferences for using media representations; and when no restrictions associated with the media representations are determined to exist in the operating step based on the comparing, transmitting with an object gateway linked to the communications network the matching one of the media objects to the network device operated by the requesting one of the users, wherein the comparing of the owner preferences with the user preferences comprises determining whether the media representation of the matching one of the media objects is compatible with a presentation context defined by the user preferences.

2. The method of claim 1, wherein each of the user preferences comprises a specification of a device used for presenting media representation.

3. The method of claim 1, further comprising associating a rating with the media objects defining a recommended user of a media representation, wherein each of the user preferences comprises a rating requirement, and wherein the comparing further includes determining whether the rating requirement in the owner preferences is satisfied by the rating associated with the matching one of the media objects.

4. The method of claim 1, wherein each of the user preferences comprises an intended use for the requested one of the media objects and wherein the comparing includes determining whether the intended use is allowed by the owner preferences.

5. The method of claim 1, further comprising prior to the transmitting of the matching one, delivering to the network device a listing of restrictions associated with the matching one and receiving an indication of acceptance from the one of the users of the restrictions at the server.

6. The method of claim 5, further comprising after the receiving of the indication of acceptance, operating the server to transmit a ticket comprising license terms and prior to the transmitting of the media object, transferring the ticket to an object gateway that responds by performing the transmitting of the media object.

7. The method of claim 1, wherein the request comprises a time the requested one of the media objects is scheduled for presentation and further comprising determining with the server whether the scheduled presentation time is compatible with the owner preferences for the matching one of the media objects.

8. A method of assembling media representations for a particular instance of a presentation of media, comprising:
providing a media object datastore linked to a digital communications network storing in memory a plurality of media objects, wherein each media object is uniquely identified and is associated with transaction information indicating a manner in which the media object can be incorporated in an instance of a media representation;
operating a server linked to the network to author a media product recipe making reference to one or more of the media objects;
obtaining with the server a set of user preferences associated with a user identifier for a user of a device operable to access the network;
constructing a transaction context using the set of user preferences and the transaction information associated with the one or more media objects, wherein the transaction context dynamically affects how the media representation will be presented at a presentation time on the user device;
instantiating the media representation on the user device in accordance with the transaction context to create a particular instance of a presentation; and
storing in memory accessible via the network a transaction document describing transaction details of the constructed transaction context.

9. The method of claim 8, wherein the transaction document is created after constructing the transaction context and before instantiating the media objects of the media representation.

10. The method of claim 8, wherein the media product recipe is formed such that at least some of the one or more of the media objects are selected based on the set of user preferences.

11. The method of claim 8, wherein the set of user preferences comprises one or more preferences from the set of preferences consisting of type of device for displaying media objects, rating requirements, level of service, physical address of the user, billing or payment preferences, and intended use of the media representation.

12. The method of claim 8, further comprising prior to the operating the server to author the media product recipe, receiving a media request from the user, selecting providers of the one or more media objects based on the set of user preferences, and negotiating the transaction document between the user and the providers.

13. A computer-based method for managing transfer of media assets formatted as media representations over digital communications networks to users, comprising:
storing a plurality of media objects in a datastore accessible via a communications network, wherein each of the media objects comprises a media representation, a unique identifier, and a media descriptor defining preferences of an owner of the media representation for use of the media representation;
storing a plurality of user objects in a datastore accessible via the communications network, wherein each of the user objects comprises a unique identifier for a user of media representations and a participant descriptor defining preferences of the user for using media representations;
receiving a request for one of the media objects from a network device operated by one of the users;
with a server, processing the request to identify a matching one of the user objects linked to the requesting one of the users and to identify a matching one of the media objects in the datastore;
operating the server to determine whether to fulfill the request by comparing the owner preferences for the media representation of the matching one of the media objects with the user preferences for using media representations; and
based on the comparing, transmitting with an object gateway linked to the communications network the matching one of the media objects to the network device operated by the requesting one of the users;
wherein each of the user preferences comprises a specification of a device used for presenting media representation and the operating of the server comprises verifying the matching one of the media objects has a corresponding specification of devices in the preferences of an owner of the media representation.

14. A computer-based method for managing transfer of media assets formatted as media representations over digital communications networks to users, comprising:
storing a plurality of media objects in a datastore accessible via a communications network, wherein each of the media objects comprises a media representation, a unique identifier, and a media descriptor defining preferences of an owner of the media representation for use of the media representation;
storing a plurality of user objects in a datastore accessible via the communications network, wherein each of the user objects comprises a unique identifier for a user of media representations and a participant descriptor defining preferences of the user for using media representations;

associating a rating with the media objects defining a recommended user of a media representation, wherein each of the user preferences comprises a rating requirement;

receiving a request for one of the media objects from a network device operated by one of the users;

with a server, processing the request to identify a matching one of the user objects linked to the requesting one of the users and to identify a matching one of the media objects in the datastore;

operating the server to determine whether to fulfill the request by comparing the owner preferences for the media representation of the matching one of the media objects with the user preferences for using media representations;

based on the comparing, transmitting with an object gateway linked to the communications network the matching one of the media objects to the network device operated by the requesting one of the users;

wherein the comparing further includes determining whether the rating requirement in the owner preferences is satisfied by the rating associated with the matching one of the media objects.

* * * * *